Figure 1:
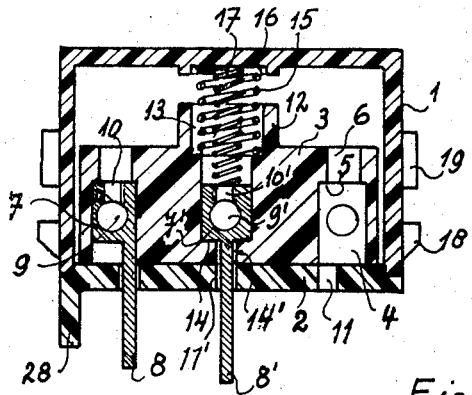

United States Patent [19]
Attema

[11] 3,871,729
[45] Mar. 18, 1975

[54] SYSTEM FOR THE INSTALLATION OF ELECTRIC WIRING IN A BUILDING

[75] Inventor: Gijsbertus Attema, Gorinchem, Netherlands

[73] Assignee: Researchcentrum Ogemat N.V., Gorinchem, Netherlands

[22] Filed: Oct. 2, 1972

[21] Appl. No.: 294,365

[30] Foreign Application Priority Data
Oct. 6, 1971 Netherlands............................ 13699
Oct. 25, 1972 Netherlands............................ 11599

[52] U.S. Cl. ............................ 339/21 R, 339/14 R
[51] Int. Cl. ............................................. H01r 9/00
[58] Field of Search......... 339/14 R, 20, 21 R, 21 S, 339/22 T, 23, 24, 206, 209

[56] References Cited
UNITED STATES PATENTS

| | | | |
|---|---|---|---|
| 2,234,745 | 3/1941 | Rarrel | 339/21 R |
| 3,081,442 | 3/1963 | Platz | 339/21 R X |
| 3,239,795 | 3/1966 | Verrone | 339/91 |
| 3,422,387 | 1/1969 | Sprigings et al. | 339/21 R |
| 3,541,224 | 11/1970 | Joly | 174/72 |
| 3,603,918 | 9/1971 | Woertz | 339/14 R |
| 3,611,247 | 10/1971 | Adams et al. | 339/206 R |
| 3,636,494 | 1/1972 | Smith | 339/14 R |
| 3,639,709 | 2/1972 | Hart et al. | 339/21 R X |
| 3,649,741 | 3/1972 | Fremont | 339/21 R X |
| 3,748,629 | 7/1973 | Price | 339/21 R |
| 3,757,273 | 9/1973 | Hesse | 339/21 R |
| 3,771,103 | 11/1973 | Attema | 339/21 R |

Primary Examiner—Roy D. Frazier
Assistant Examiner—Robert A. Hafer
Attorney, Agent, or Firm—George F. Smyth

[57] ABSTRACT

A system for installation of electric wiring in a building comprising profiled cable ducts, flat cables consisting of a flat insulating and pliable carrier with open grooves and naked conductors in said grooves, contact plugs for making electrical connections with and between such cables, which plugs are adapted to be clamped in a cable duct, contact pins of the plug then projecting into the grooves of the flat cable in said duct and making contact with the conductors in said grooves, additional profiled ducts for electric wiring between a cable duct and switch or contact means to be mounted on a wall, and mounting means for such switch or contact means.

29 Claims, 15 Drawing Figures

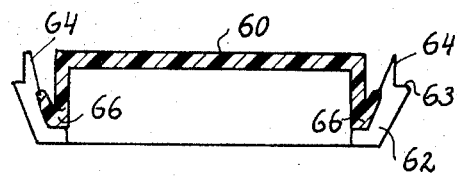
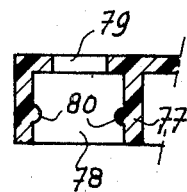
Fig. 12
Fig. 13
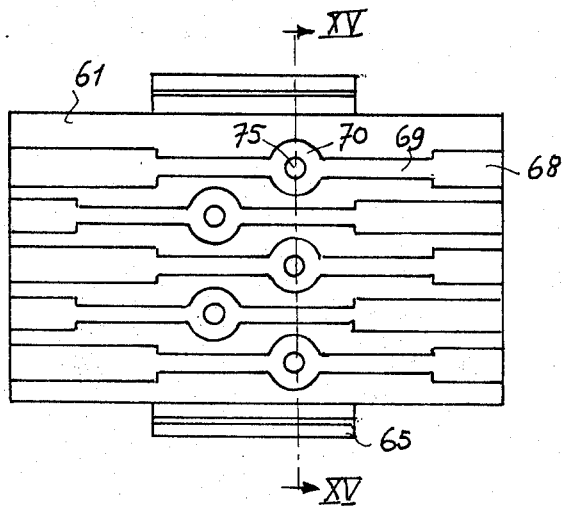
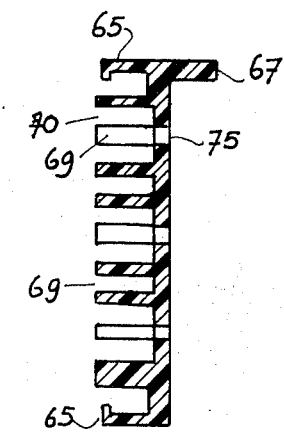
Fig. 14
Fig. 15

3,871,729

SYSTEM FOR THE INSTALLATION OF ELECTRIC WIRING IN A BUILDING

In my co-pending U.S. Pat. application Ser. No. 219,996 filed Jan. 24, 1972, elements for a system for installation of electric wiring in a building have been described, such as cable ducts or troughs in the form of a ceiling or skirting board profile, a flat cable to be clamped behind interior ribs of such a cable duct and comprising naked conductors lying in open grooves of a flat insulating casing, and contact means to be clamped in such a cable duct and comprising contact pins or strips, each being adapted to make contact with one conductor of such a cable when the contact means in question is inserted in such a duct.

A system of this kind will provide considerable labor savings during installation of electrical wiring in existing buildings as well as in new ones. Providing contact or switching means afterwards is, moreover, greatly simplified in such a system.

The present invention provides an extension of such a system allowing this system to be adapted to all possible circumstances.

To that end the system according to the invention is characterized by a removable branching contact plug to be clamped in a duct, by a connecting contact plug to be clamped in a duct for providing a connection between either two flat cables or one such cable and separate conductors, by additional flat tubular or channel profiles accommodating branch lines leading toward switch or contact means to be mounted on a wall, and by a mounting plate for mounting such means on a wall.

Figure 3:
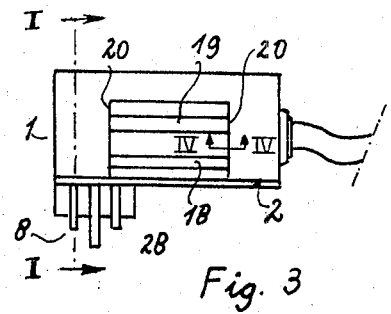
Figure 2:
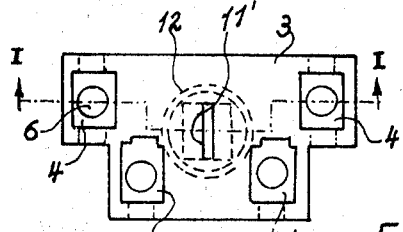
Figure 4:
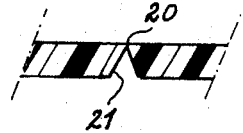
Figure 5:
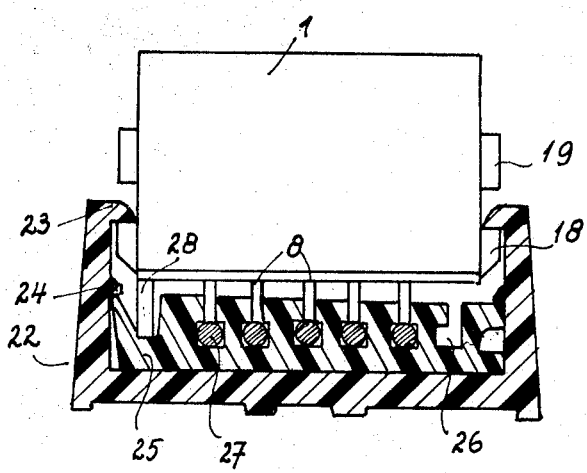
Figure 6:
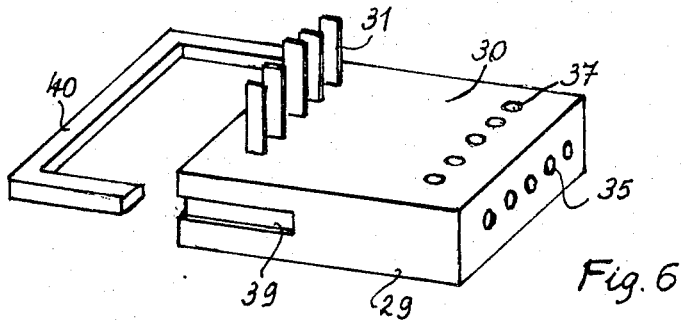
Figure 7:
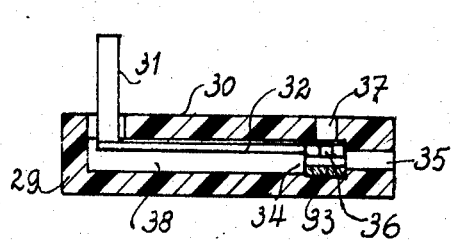
Figure 8:
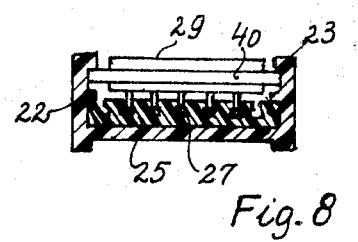
Figure 9:
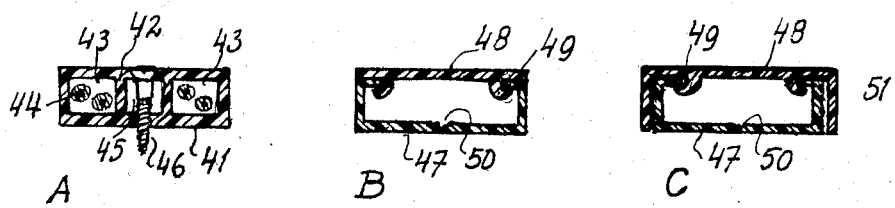
Figure 10:
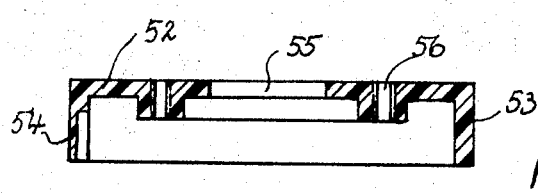
Figure 11:
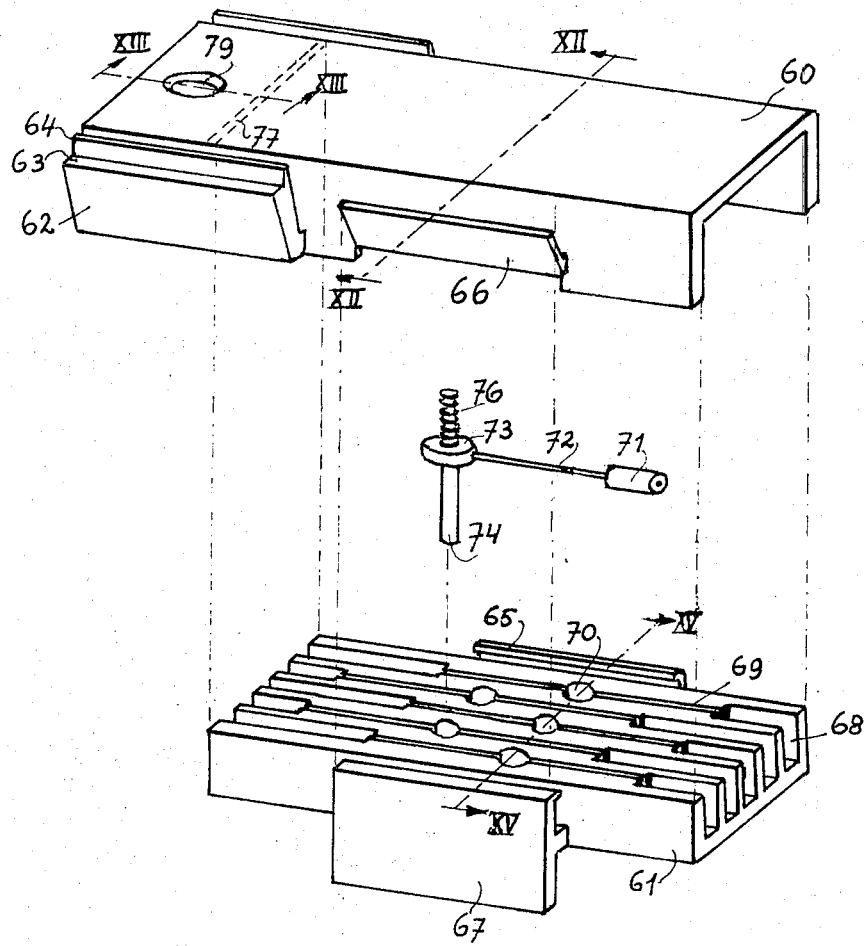

The invention will be elucidated below by reference to a drawing, showing in:

FIG. 1 a diagrammatic cross-section of a removable branching plug according to the invention on lines I — I of FIGS. 2 and 3;

FIG. 2 a bottom view of the contact carrier of the branching plug of FIG. 1;

FIG. 3 a side view on a reduced scale of the branching plug of FIG. 1;

FIG. 4 a cross-section on a larger scale on line IV—IV of FIG. 3;

FIG. 5 a cross-section of a cable duct with a branching plug according to the invention clamped therein;

FIG. 6 a perspective view of a connecting plug according to the invention with an associated fixing brace;

FIG. 7 a cross-section of the connecting plug of FIG. 6;

FIG. 8 a cross-section on a reduced scale of a cable duct with a connecting plug of FIG. 6 placed therein;

FIG. 9 cross-sections of a number of embodiments of an additional connecting profile according to the invention;

FIG. 10 a cross-section of a mounting plate according to the invention;

FIG. 11 an exploded perspective view of another embodiment of a branching or connecting plug according to the invention;

FIG. 12 and FIG. 13 cross-sections of one part of this plug;

FIG. 14 a top view of the other part of this plug; and

FIG. 15 a section on line XV — XV of FIG. 14.

The branching plug of FIGS. 1 – 5 comprises a casing with a cover 1 and a bottom 2. Inside this cover a carrier 3 for a number of contact pins is present.

The carrier 3 is provided with four recesses 4 which are open at one surface of the carrier, and which, by means of a shoulder 5, pass into bores 6 with a smaller width near the other surface. A rectangular head 7 of a contact pin 8 fits in each recess 4, the end face of the head 7 abutting the shoulder 5. In the head a transverse bore 9 is provided, and a threaded hole 10 opens in the end face, in which hole a clamping screw, not shown, may be provided enabling an electrical conductor to be locked in the bore 9. The contact pins 8 extend through suitable holes 11 in the bottom 2 of the casing.

In the center of the carrier and at the surface remote from the bottom 2, an upstanding collar 12 is situated, having a central recess 13 which is delimited at its lower end by a shoulder 14 joined by a hole 14' extending towards the other surface of the carrier 3 and situated in front of an additional, elongated hole 11' in the bottom 2. The head 7' of a grounding pin 8' fits in the recess 13, which head is provided with a transverse bore 9' and a threaded hole 10' corresponding respectively to the bores 9 and threaded hole 10 of the other contact pins. In the seat 12 a helical spring 15 is provided fitting, at its other end, in a suitable seat 16 in the cover 1, and forcing the carrier 3 against the bottom 2. In the center of the spring 15 a second spring 17 is provided, abutting, at one end, the cover 1 and, at the other end, the head 7' of the contact pin 8'.

At the outer side of each longitudinal wall of the casing 1 a locking cam 18 and a pressing ridge 19 parallel to the former are provided, both extending along a part of the lateral surface delimited by two incisions or weakened areas 20 (FIG. 3). The cover 1 preferably consists of a rather elastic plastic material, so that the part between both incisions 20 forms a resilient tongue which, when pressure is exerted on the ridge 19, can move inwardly. The locking cams 18 are somewhat bevelled at the side directed towards the bottom. The incisions 20 are, for instance, formed during injection moulding of the cover 1 as shown in FIG. 4, by moulding in the inner wall a wedge-shaped recess 21, the tip of which is opening exactly in the outer surface. In that manner a substantially closed outer wall is obtained satisfying the insulation requirements.

FIG. 5 shows a cable duct 22 with interior ribs 23 and 24 as described in my prior application Ser. No. 219,996. Behind the ribs 24 a flat cable 25 is clamped which is provided with longitudinal grooves 26 in a part of which bare or uninsulated conductors 27 are provided as described in the latter patent application. The contact plug of FIG. 1 may be pressed into such a cable duct, and then the bevelled locking cams 18 will slide past the ribs 23 by the elasticity of the wall portion in question, and will snap outwards beyond these ribs. The contact pins 8 and 8' then penetrate into the corresponding grooves 26 of the cable 25, and will make contact with the conductors 27 in question. The carrier 3 is pushed inwards thereby and the spring 15 is compressed. The grounding pin 8' extending, as shown in FIG. 1 slightly further than the other contacts, will contact the corresponding grounding conductor first, and the spring 17 will thus be partially compressed thereby. In this manner it is ensured that the ground contact between the current conductors and the other pins. The cams 18 are pressed against the ribs 23 by the force of the spring 15, and, at the same time, a sufficient contact pressure is maintained thereby. For removing such a contact plug the pressing ribs 19 are pressed inwards, so that the cams 18 may be moved past the ribs 23. The contact pins 8 will then leave the conductors 27 earlier than the ground contact pin 8' which is pressed outwardly by the spring 17.

In order to ensure that the pins 8 will always contact the same conductors 27, the bottom 23 of the casing is preferably provided with a positioning ridge 28 which, as shown in FIG. 5, fits in a groove 26' of the cable 25 in which no conductor 27 is present, which groove, for instance, may serve for providing a certain lateral deformability when introducing the cable into the cable duct 22.

It should be noted that such a contact carrier 3 may also be used in a connection box according to may prior patent application Ser. No. 219,996.

The cover 1 is, furthermore, provided with one or more apertures through which connecting cord or cable may be lead and, if desired, a port closed by a rupturable wall may be provided in the upper surface allowing a lamp fitting to be directly mounted on such a plug. This may, for instance, be useful in display cabinets, exhibition spaces and the like, since, then, the illumination may be easily adapted to variable circumstances by moving contact plugs provided with lamp fittings along a cable duct according to FIG. 5, or by adding additional contact plugs with lamp fittings.

FIGS. 6 and 7 show another contact plug according to the invention, intended for making connections which are, in principle, permanent, for instance between a flat cable 25 of FIG. 5 and a current supply cable, or between such a flat cable and a branch line consisting of ordinary insulated wires, or between two flat cables, for instance for making an angle connection between two cable ducts.

The contact plug shown comprises a carrier or housing 29 with plane surfaces and a relatively small thickness. From one of the surfaces 30 a plurality of contact pins 31 extends outwards. As appears from FIG. 7, each pin 31 is connected with a connecting strip 32, which, at its other end, is connected to a terminal block 33. This block has a bore 34 situated in front of a corresponding hole 35 in the transverse surface of the carrier 29, through which the naked end of an insulated conductor may be inserted. Furthermore, the block 33 comprises a threaded hole 36 transversely to the bore 34 and situated in front of a hole 37 in the surface 30, in which hole a set screw may be arranged for securing a conductor in the bore 34. The cavity 38 in which such an assembly is situated is, for instance, shaped so that the contact pin 31 may be slightly pushed inward, and the connecting strip 32 is sufficiently flexible for allowing such a movement. It is, however, also possible to embed the pins 31, the strips 32 and the blocks 33 completely in the plastics material of the carrier 29. It is also possible to solder the conductors to be connected to the contact plug to the blocks 33 before including the latter in the carrier 29, and to enclose these conductors in a sheath which will be united with the plastics material of the carrier 29, in which case the holes 37 will be omitted.

Both side walls of the carrier 29 are provided with a groove 39, a leg of a horse-shoe shaped clamping brace 40 fitting in this groove. As appears from FIG. 8, the carrier 29 fits between the ribs 23 of a cable duct 22, so that this carrier may be simply inserted into the cable duct in order to bring the pins 31 into contact with the corresponding conductors 27. The brace 40 which has such a width that it may bear against the transverse surfaces of the ribs 23, is, then, pushed into the grooves 39, thus securing the carrier 29 in the duct 22.

Particularly when such a cable duct 22 is shaped as a skirting board duct, branch lines leading to switches, lighting fixtures and the like must often be arranged along the contiguous wall. The usual plastic tubes with a circular cross-section are often, and particularly in living and office rooms, objectionable as being unsightly, and accommodating such tubes in the wall is often time consuming and expensive. FIG. 9 shows a number of embodiments of flat profiles, the thickness thereof being not larger than the thickness of a door or window frame or of wall strips as used, for instance, on walls composed of discrete wall elements.

FIG. 9A shows a fully closed profile 41 with two internal transverse partitions 42 delimiting two passages 43 into which insulated wires 44 may be inserted. Through the central passage 45 fixing nails or screw 46 may be driven which, thus, remain unambiguously separated from the conductors 44.

FIG. 9B shows a profile with a bottom 47 and a cover 48 which can be interconnected by means of a snap lock 49. The bottom 47 is provided with a continuous or interrupted groove 50 facilitating fixing nails or screws to be arranged. It is also possible to fix the cover to the wall and to snap the bottom on the cover. FIG. 9C shows a corresponding profile in which the cover is provided with lateral walls 51 covering the sides of the bottom 49, the seam thus being made invisible.

For mounting switches, lighting fixtures and the like on a wall, a mounting plate according to FIG. 10 is used. This plate comprising a plane part 52 with an upstanding rim 53, the latter being provided with rupturable ports 54 having dimensions which correspond to those of the profiles of FIG. 9. The part 52 is, furthermore, provided with a hole 55 for electric wires, embedded threaded bushings 56 for fixing switches and the like, and holes (not shown) for fixing screws.

In this manner a system is obtained which allows electric wiring which is not unsightly to be installed in a quick and simple manner on a wall of a building, and an unlimited extension without radical operations remains possible.

FIGS. 11 - 15 shows another embodiment of a branching or connecting plug of the invention. As shown in FIG. 11, this plug comprises two main parts, namely a cover 60 and a bottom 61. The cover 60 has substantially a U-shaped cross-section having such a width that this cover fits in a cable duct of the kind described above. Near one extremity resilient locking cams 62 having a shoulder 63 fitting behind an interior rib of the cable duct are provided. This shoulder is joined by a lip 64 which, when the cover is inserted in the cable duct, remains accessible from the outside, and may, for instance, be pushed inwards by means of a screwdriver or the like, in order to release the cover 60 from the cable duct.

The bottom 61 substantially fits between the legs of the cover 60, and is provided with laterally extending hooks 65 adapted to grip behind resilient lips 66 at the outer side of the side walls of the cover 1, these hooks 65 and lips 66 forming together a snap lock. It will be clear that other types of snap locks may be used instead, and that, if desired, both parts may also be interconnected by means of clamping springs, screws or the like. Furthermore, it will be clear that the outer surfaces of the hooks 65 should have a mutual distance which is not larger than the distance between the interior ribs of a cable duct.

As clearly appears from FIG. 15, one of the hooks 65 is extended downwardly so that a positioning ridge 67 is obtained, fitting in an empty groove of a flat cable, thus ensuring that the branching plug is always brought into contact with the cable in the same position.

Furthermore the bottom 61 comprises a number of parallel longitudinal grooves 68 extending over the full length of the bottom, and being narrowed in their middle portion 69, a widened part 70 with a circular cross-section being present in this narrowed portion. The wider parts 68 of these grooves have a width substantially corresponding to the thickness of an insulated wire 71, the narrower parts 69 having a width corresponding to the thickness of the conductor proper 72 (FIG. 11). A part of the insulation of the wire 71 has been removed, and the naked part 72 is fixed, and in particular soldered, to a small disc 73, a contact pin 74 joining this disc 73. The disc 73 has a diameter corresponding to the diameter of the widened parts 70, and the contact pins 74 fit in holes 75 each coaxially communicating with a corresponding widened part 70. A helical spring 76 bears on this disc 73, which spring, in the assembled condition of the branching plug, abuts the transverse wall of the cover 60.

The required number of contact pins 74 which are, in the manner shown, connected to a wire 71, is inserted into the widened parts or chambers 70 in question, the wires 71 being laid in either one or the other direction from these chambers 70 into the grooves 68 in question. Thereafter the cover 60 can be snapped on the bottom, and then the branching plug is ready for use.

The branching plug shown is, in particular, intended for supporting a lamp holder, more particularly for a luminescent tube. By means of a transverse partition 77, a chamber 78 is separated (see FIG. 13) into which a hole 79 in the upper wall of the cover 60 opens. The chamber 78 has such a width that the head of a bolt fits therein, so that this head will be held in a non-rotatable manner. Furthermore, this chamber comprises ribs 80, and the partition 77 and the facing transverse wall of the cover 60 are sufficiently yielding for allowing the bolt head to be pressed beyond these ribs. These ribs then hold the bolt head sufficiently firmly. On this bolt a lamp holder may be screwed. It is, of course, also possible to include threaded bushings or the like in the cover 60.

For supporting a holder for a luminescent tube, each extremity of the latter is connected to a branching plug of FIg. 11, in order to enable both ends to the firmly fixed in a cable duct. In this manner such luminescent tube holders may be quickly mounted in a cable duct extending, for instance, along a ceiling or other wall. For the electric connections to such a lamp only one contact plug is required, so that, if desired, the bottom with the contact pins may be omitted in the other one.

It will be clear that many other modifications are possible in such a contact plug, and the latter may also be used, for instance, for mounting a socket outlet on a cable duct or skirting board channel. The fixing means may be constructed in another manner, for instance as described in relation with the preceding embodiments. Instead of the contact pins with a solder connection as shown, also contact pins with a set screw may be used, and it is also possible to arrange contact strips in the groove parts 69, which are fixed to the contact pins 74, and which may be connected to connecting wires in the wider groove parts 68, and may, if desired, be constructed as spring blades. Moreover, it may be favorable to use the extremities of the conductors 72 themselves instead of separate contact pins, which extremities are, then, perpendicularly offset, and may be submitted to a hardening and/or surface treatment.

Finally it will be clear that parts which, in the embodiment shown, belong to the cover or bottom, may also be formed as parts of the bottom or cover respectively.

I claim:

1. A contact plug including
   a housing comprising
   an elongated bottom member having
   apertures extending therethrough in a first direction
   contact pins slidably mounted in said apertures and extending from said housing,
   means for biasing said contact pins so that they normally extend from said housing,
   longitudinal upstanding ribs extending along one surface of said bottom member and defining
   grooves extending along said housing in a second direction and intersecting said apertures, and
   electrical conductors extending along said grooves and connected to said contact pins and
   an elongated cover member for enclosing said ribs, grooves, conductors, and one end of said apertures and including
   means against which said biasing means may react when urging said contact pins out of said housing,
   means for releasably attaching said bottom member thereto, and
   means for releasably attaching said housing behind a pair of ribs within an elongated cable duct having a width dimension which is only wider than the width of said housing by an amount sufficient to allow said attaching means to cooperate with the ribs when said housing is pushed into the duct.

2. The contact plug of claim 1, characterized in that said grooves extend to both sides of said apertures.

3. The contact plug of claim 1 characterized in that the contact pins are provided with a collar located within the housing, said biasing means bearing on said collar, and said collar being adapted to be connected to one of said electrical conductors.

4. The contact plug of claim 1, characterized in that said contact pins are formed by the offset extremities of said connecting conductors.

5. The contact plug of claim 1, characterized by means provided on one of said sections for fixing and electrically connecting to said pins an element such as a lamp holder.

6. The contact plug of claim 5, characterized in that one of said sections is provided with a chamber in which the head of a bolt may be fixedly mounted, and into which an opening provided in said one of said sections extends, the bolt shaft fitting through said opening when the head thereof is located in said chamber.

7. An electrical wiring system comprising a cable duct of substantially U-shaped cross-section having
  a first inwardly directed rib means near at least one free edge of said duct and
  a second inwardly directed rib means parallel to said first rib means,
flat cable means held within said duct by said second rib means and having
  an insulating base,
  a plurality of apertures extending substantially parallel and through said base,
  means providing access to each of said apertures from one said base, and
  uninsulated conductor means extending axially along each of said apertures, and
connector means for creating an electrical circuit to utilize power being transmitted through said conductors comprising
  a housing having
    means thereon for releasably fixing said connector means within said duct by cooperation of said fixing means with said first rib means,
  carrier means movably mounted in said housing,
  a plurality of contact pin means mounted on said carrier means and extending from said housing, and
  means in said housing for biasing said carrier means such that each of said pin means, extends through one of said access means and into contact with a conductor therein such that the axisintersecting end of each said pin means is held in contact with its associated conductor with a predetermined force.

8. The system of claim 7 wherein
said access providing means comprises
  a plurality of relatively narrow slits in said base, each extending from one of said apertures to a surface of said base.

9. The system of claim 7 wherein
said pin means each have
  an elongated cross-section terminating in a relatively flat end face for contacting a conductor across a predetermined surface area.

10. The system of claim 7 wherein said carrier means includes
  means for mounting said plurality of contact pin means including
  means for movably mounting at least one of said contact pin means relative to said carrier means.

11. The system of claim 7 wherein at least one of said pin contact means is longer than the other pin contact means, and including
  means for biasing said at least one pin contact means into a position of maximum extension from said housing while allowing at least partial retraction thereof when said connector is operatively connected in said duct.

12. The system of claim 7 wherein
said releasable fixing means comprises
  locking cam means mounted on the exterior of said housing.

13. The system of claim 12 wherein
said housing further includes
  incision means operatively associated with said locking cam means to produce resiliency in said housing and thus allow movement of said locking cam means relative to said first rib means.

14. The system of claim 7 wherein
said housing includes
  groove means in at least two exterior sides thereof and
said releasable fixing means comprises
  brace means mounted in said groove means and extending outwardly beyond the inner dimension of said first rib means.

15. The system of claim 7 including
means for preventing said connector means for being improperly installed in said cable duct relative to said cable means.

16. The system of claim 7 wherein the thickness of said connector is so proportioned as to not extend beyond the free edges of said duct when operatively positioned therein.

17. An electrical connector for use with a cable duct comprising
  a housing having a generally thin configuration such as to fit substantially completely within the cable duct,
  carrier means movably mounted in said housing,
  a plurality of first contact pins fixedly mounted on said carrier means and extending from said housing,
  a second contact pin movably mounted on said carrier means and normally extending from said housing a greater distance than said first contact pins, and
  biasing means for urging said first and second contact pins toward their extended positions while allowing at least partial retraction thereof relative to said housing when said connector is operatively positioned within a duct and while allowing at least partial retraction of said second contact pin relative to said first contact pins.

18. The electrical connector of claim 17 including
means formed integral with the exterior of said housing for releasably fixing said connector within a duct.

19. The electrical connector of claim 18 including
brace means removably mounted in said fixing means for cooperation with means in a cable duct to hold said connector in place therein.

20. The electrical connector of claim 18 wherein
said fixing means comprises
  cam means on opposed sides of said housing for cooperation with holding means in a cable duct and
  weakend areas formed in the walls of said housing so that said cam means are resiliently cooperable with the cable duct holding means for installation and removal of said connector 21. The connector of claim 18 wherein
said fixing means comprises
  gripping means resiliently formed on opposed walls of said housing.

22. The electrical connector of claim 17 including
carrier means movably mounted in said housing and in which said first and second contact pins are mounted, and wherein
said biasing means urges said carrier means in a first direction relative to said housing.

23. The electrical connector of claim 22 including
second biasing means for urging said second contact pin in said first direction relative to said carrier means.

24. A system for the installation of electric wiring in a building, comprising:
  a profiled cable duct with a substantially U-shaped cross-section provide with a first set of inwardly directed ribs near the free edges of said duct, and with a second set of inwardly directed ribs parallel to and below said first set;
  a flat cable to be clamped behind said second set of ribs of said cable duct, said cable comprising an insulation base with a plurality of parallel longitudinal grooves opening in one surface of said base by means of narrow slots, bare conductors arranged in said grooves and being accessible from the outside of said cable through said narrow slots; and
  a connector adapted to be clamped behind said first set of ribs of said cable duct and having a housing with a flat bottom wall, a carrier means movably mounted in said housing, a plurlity of contact pins mounted on said carrier means and projecting from said bottom wall, said pins each being arranged to fit in a corresponding slot of said cable when the connector is clamped into said cable duct, said bottom wall then being substantially parallel to the groove surface of said cable, said carrier means being resiliently supported in said connector housing so as to be movable in the direction in which said contact pins extend, said pins having a flat, rectangular cross-section, the smaller dimension being substantially equal to the width of a slot in the cable base, the longer dimension being directed in the longitudinal direction of the slot in question when the connector is inserted in said duct, the end face of each pin being substantially flat and being adapted to contact the surface of a bare conductor in the cable groove in question, the surface area of said end face being sufficiently large for conducting the envisaged current and providing, at the spring pressure exerted on said pin, a sufficiently small and substantially constant contact resistance, wire terminals being provided for making electrical connections between external conductors and said contact pins.

25. The system of claim 24 in which one contact pin corresponding to a ground conductor of said flat cable is made longer than the other contact pins of said connector, said one contact pin being individually axially biased relative to said carrier means.

26. The system of claim 24 wherein said cable base includes, near one lateral side of said grooved surface, a wider groove without a conductor, said connector being provided, near the corresponding side thereof with a projecting positioning ridge fitting in said groove when said connector is inserted in said cable duct.

27. The system of claim 24, in which the longitudinal side walls of the connector housing are provided with projecting shoulders adapted to engage behind the first set of ribs of a cable duct.

28. The system of claim 27, in which said shoulders are mounted on resilient wall sections adapted to be pressed inwardly for releasing said connector.

29. The system of claim 27, in which said shoulders are formed by a horse-shoe shaped brace fitting in corresponding grooves in the longitudinal side walls of the connector housing.

* * * * *